(12) United States Patent
Huebner

(10) Patent No.: US 6,451,213 B2
(45) Date of Patent: *Sep. 17, 2002

(54) METHODS AND APPARATUS FOR DE-WATERING SLUDGE

(75) Inventor: Gary W. Huebner, Dripping Springs, TX (US)

(73) Assignee: Wawcon, Inc., Dripping Springs, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/738,006

(22) Filed: Dec. 14, 2000

Related U.S. Application Data

(63) Continuation of application No. 09/447,170, filed on Nov. 22, 1999, now Pat. No. 6,241,902.

(51) Int. Cl.$^7$ .............................................. C02F 11/12
(52) U.S. Cl. ...................... 210/770; 210/784; 210/791; 210/797; 210/394; 210/396; 210/408; 100/112; 100/117; 100/128; 100/145
(58) Field of Search ............................. 210/415, 256, 210/394, 396, 770, 780, 781, 791, 784, 797, 391, 408; 100/117, 146, 145, 128, 112

(56) References Cited

U.S. PATENT DOCUMENTS

| 604,348 A | 5/1898 | Bussells |  |
|---|---|---|---|
| 2,960,926 A | 11/1960 | McKee |  |
| 3,695,173 A | 10/1972 | Cox | 100/74 |
| 3,938,434 A | 2/1976 | Cox | 100/117 |
| 3,965,173 A | 6/1976 | Chubb et al. | 260/556 |
| 4,041,854 A | 8/1977 | Cox | 100/112 |
| 4,202,773 A | 5/1980 | Fink et al. | 210/256 |
| 4,214,377 A | 7/1980 | Maffet | 34/12 |
| 4,237,618 A | 12/1980 | Maffet | 34/12 |
| 4,286,512 A | 9/1981 | Berggren | 100/74 |
| 4,380,496 A | 4/1983 | Maffet | 210/780 |
| 4,528,098 A | 7/1985 | Treyssac et al. | 210/414 |
| 5,122,263 A | 6/1992 | Huber | 210/110 |
| 5,552,044 A * | 9/1996 | Abel | 210/324 |
| 6,241,902 B1 * | 6/2001 | Huebner | 210/781 |

* cited by examiner

*Primary Examiner*—Robert Popovics
(74) *Attorney, Agent, or Firm*—Fulbright & Jaworski, LLP

(57) ABSTRACT

An apparatus for de-watering sludge. A main shaft is rotated about a longitudinal axis at a first rate. A screw shaft coupled to the main shaft is rotated about the longitudinal axis at the first rate. Screw flighting coupled to the screw shaft is rotated about the longitudinal axis at the first rate. A first and second stage drum are rotated about the longitudinal axis at a second rate. Sludge is introduced to a first area defined by an outer surface of the screw shaft and an inner surface of the first stage drum. Moisture is removed from the sludge through a first slot coupled to the first stage drum. The sludge is transported with the screw flighting from the first area to a second area defined by an outer surface of the screw shaft and an inner surface of the second stage drum, the second area being larger than the first area. Moisture is removed from the sludge through a second slot coupled to the second stage drum.

20 Claims, 3 Drawing Sheets

METHODS AND APPARATUS FOR DE-WATERING SLUDGE

This is a continuation of application Ser. No. 09/447,170, filed Nov. 22, 1999 now U.S. Pat. No. 6,241,902.

BACKGROUND OF THE INVENTION

1. Field of the Invention

The present invention relates generally to the fields of de-watering sludge. More particularly, it concerns methods and apparatus for de-watering sludge by utilizing a multi-stage, rotating drum technique.

2. Description of Related Art

The ability to remove water from products such as waste products has long been recognized as useful. Removing water from sludge, and more particularly, sewage sludge, greatly reduces the weight of material to be transported for disposal and/or use. Additionally, de-watering sludge may facilitate the processing of sludge into soil conditioners and fertilizers.

De-watering of sludge has been accomplished in the past by various methods, including open-air drying, vacuum filtration, centrifugation, mechanical pressing, and other mechanical separation. Although each has utilized at least a degree of usefulness, room for significant improvement remains.

U.S. Pat. No. 3,695,173 describes a technique for sludge de-watering. There, de-watering is achieved as sludge is moved through a filter de-watering unit, where squeezing and pressing takes place. The squeezing and pressing forces most of the liquid or water through a filtering medium or slots. Cleaning blades or brushes are used prevent clogging and interruption of continuous filtration or de-watering. Although this technique may be useful for de-watering certain types of sludge, problems remain. For instance, if there is too little sludge being fed into the device, the sludge may not be squeezed enough. Consequently it may not be dried sufficiently. Further, if too much sludge enters the device, it may come under too much pressure and may be forced out through the device. Consequently, sludge may be lost and may need to be recirculated. Still further, if a polymer has been used on the sludge being de-watered, this system may, if subjected to high pressures, break polymer bonds and may therefore not be effective in de-watering sewage sludge, especially re-circulated sludge.

U.S. Pat. No. 4,286,512 describes another technique that may be used to remove liquid from a material. There, a screw press is used for pressing liquid from fibrous slurries, such as paper pulp, sludge, or sedimentation. Material is fed into the press at one end of a rotating press screw. The core of the screw has an increasing diameter such that the space defined between the core and wall of a drum gradually decreases so as to aid in the pressing process. A rotating drum rotates about the core to further aid in the draining of liquid pressed from the slurry due to the action of the press-screw. Although this technique also may be useful for de-watering certain types of sludge, similar problems remain due mostly to the fact that this technique relies upon pressing of the sludge to achieve drying. Again, if there is too little sludge being fed into the device, the sludge may not be squeezed enough. On the other hand, if too much sludge enters the device, it may come under too much pressure and may be prematurely forced out of the device. Consequently, sludge may be lost and may need to be recirculated. Still further, if a polymer has been used on the sludge being de-watered, this system may, if subjected to high pressures, break polymer bonds. For this reason, such a system may not be effective in de-watering sewage sludge, especially recirculated sludge.

U.S. Pat. No. 4,202,773 describes another technique that may be used to de-water sludge. There, clarifier sludge may be de-watered by passing it through an inner centrifuge drum and then to outer second drum having a diameter about twice that of the first drum. In each drum, wipers or scrapers displace solids. Each drum is unperforated, the outer drum is conical over its entire length, and the inner drum is conical in part or in whole. Although this system may be useful for de-watering certain materials, problems remain. For instance, it appears that sludge is spun at relatively high speeds to insure that solids within the sludge are displaced and so that sludge does not overly mix with water and liquids being extracted. Further, it appears that this device may subject sludge to great forces, particularly after transfer to the larger outer centrifuge, so that polymer bonds may be broken.

Problems enumerated above are not intended to be exhaustive but rather are among several that tend to impair the effectiveness of previously known devices for removing water and liquids from sludge. Other noteworthy problems may also exist; however, those presented above should be sufficient to demonstrate that devices appearing in the art have not been altogether satisfactory.

SUMMARY OF THE INVENTION

In one respect, the invention is an apparatus for de-watering sludge, including an outer housing, a main shaft, a screw shaft, a first stage drum, a second stage drum, an inlet, and screw flighting. The outer housing defines a longitudinal axis. The main shaft is configured to rotate about the longitudinal axis. The screw shaft is coupled to the main shaft and is configured to rotate about the longitudinal axis. The first stage drum is positioned between the outer housing and the screw shaft. The first stage drum is configured to rotate about the longitudinal axis, and the first stage drum has a first drum diameter. The second stage drum is coupled to the first stage drum. The second stage drum is configured to rotate about the longitudinal axis, and the second stage drum has a second drum diameter greater than the first drum diameter. The inlet is configured to introduce the sludge to a first area defined by an outer surface of the screw shaft and an inner surface of the first stage drum. The screw flighting is coupled to the screw shaft. The screw flighting is configured to rotate about the longitudinal axis to transport the sludge longitudinally from the first area to a second area defined by an outer surface of the screw shaft and an inner surface of the second stage drum, the second area being larger than the first area.

In other respects, the main shaft and the screw shaft may each be configured to rotate at a first rate, and the first stage drum and the second stage drum may each be configured to rotate at a second rate. The first rate may be less than the second rate. The first rate may equal the second rate. The main shaft may have a substantially constant outer diameter, and the screw shaft may have a substantially constant outer diameter. The apparatus may also include wiper coupled to the screw flighting. The wiper may be configured to clean an inner surface of the first stage drum and to roll the sludge from the first area to the second area. The first stage drum may include a first slot, and the second stage drum may include a second slot. Each of the first and second slots may include a smaller opening on an inner surface of the drums than on an outer surface of the drums. The first slot may be smaller than the second slot. The first slot may be about the same size as the second slot. The apparatus may also include a third stage drum. The third stage drum may be coupled to the second stage drum. The third stage drum may be configured to rotate about the longitudinal axis. The third stage drum may have a third drum diameter greater than the second drum diameter. The screw flighting may be configured to transport the sludge longitudinally from the second area to a third area defined by an outer surface of the screw shaft and an inner surface of the third stage drum, the third area being larger than the second area. The apparatus may also include a fourth stage drum. The fourth stage drum may be coupled to the third stage drum. The fourth stage drum may be configured to rotate about the longitudinal axis. The fourth stage drum may have a fourth drum diameter greater than the third drum diameter. The screw flighting may be configured to transport the sludge longitudinally from the third area to a fourth area defined by an outer surface of the screw shaft and an inner surface of the fourth stage drum, the fourth area being larger than the third area. The apparatus may also include a wash nozzle coupled to the screw shaft. The outer housing may be inclined.

In another respect, the invention is an apparatus for de-watering sludge, including an outer housing, a main shaft, a screw shaft, a drum, an inlet, screw flighting, and a wiper. The outer housing defines a longitudinal axis. The main shaft is configured to rotate about the longitudinal axis. The screw shaft is coupled to the main shaft and is configured to rotate about the longitudinal axis. The drum is positioned between the outer housing and the screw shaft and is configured to rotate about the longitudinal axis. The drum has a slot including a smaller opening on an inner surface of the drum than on an outer surface of the drum. The inlet is configured to introduce the sludge to an area defined by an outer surface of the screw shaft and an inner surface of the drum. The screw flighting is coupled to the screw shaft and is configured to rotate about the longitudinal axis to transport the sludge longitudinally along the drum. The wiper is coupled to the screw flighting and is configured to clean an inner surface of the drum and to roll the sludge along the drum.

In another respect, the invention is an apparatus for de-watering sludge including an outer housing, a main shaft, a screw shaft, a wash nozzle, a first stage drum, a second stage drum, an inlet, a screw flighting, and a wiper. The outer housing defines a longitudinal axis. The main shaft is configured to rotate about the longitudinal axis. The screw shaft is coupled to the main shaft and is configured to rotate about the longitudinal axis. The wash nozzle is coupled to the screw shaft. The first stage drum is positioned between the outer housing and the screw shaft. The first stage drum is configured to rotate about the longitudinal axis, and the first stage drum has a first drum diameter and a first slot. The first slot includes a smaller opening on an inner surface of the first stage drum than on an outer surface of the first stage drum. The second stage drum is coupled to the first stage drum. The second stage drum is configured to rotate about the longitudinal axis, and the second stage drum has a second drum diameter greater than the first drum diameter and a second slot. The second slot includes a smaller opening on an inner surface of the second stage drum than on an outer surface of the second stage drum. The inlet is configured to introduce the sludge to a first area defined by an outer surface of the screw shaft and an inner surface of the first stage drum. The screw flighting is coupled to the screw shaft. The screw flighting is configured to rotate about the longitudinal axis to transport the sludge longitudinally from the first area to a second area defined by an outer surface of the screw shaft and an inner surface of the second stage drum, the second area being larger than the first area. The wiper is coupled to the screw flighting and is configured to clean an inner surface of the first stage drum and to roll the sludge from the first area to the second area.

In other respects, the main shaft and the screw shaft may each be configured to rotate at a first rate, and the first stage drum and the second stage drum may each be configured to rotate at a second rate. The first rate may be less than the second rate. The first rate may equal the second rate.

In another respect, the invention is a method for de-watering sludge. A main shaft is rotated about a longitudinal axis at a first rate. A screw shaft coupled to the main shaft is rotated about the longitudinal axis at the first rate. Screw flighting coupled to the screw shaft is rotated about the longitudinal axis at the first rate. A first and second stage drum are rotated about the longitudinal axis at a second rate. The first and second stage drums are positioned between an outer housing and the screw shaft. Sludge is introduced to a first area defined by an outer surface of the screw shaft and an inner surface of the first stage drum. Moisture is removed from the sludge through a first slot coupled to the first stage drum. The sludge is transported with the screw flighting from the first area to a second area defined by an outer surface of the screw shaft and an inner surface of the second stage drum, the second area being larger than the first area. Moisture is removed from the sludge through a second slot coupled to the second stage drum.

In other respects, the first rate may be less than the second rate. The first rate may equal the second rate. The method may also include cleaning an inner surface of the first stage drum with a wiper coupled to the screw flighting. The method may also include cleaning an inner surface of the first stage drum with a wash nozzle coupled to the screw shaft. The method may also include rotating a third stage drum about the longitudinal axis at the second rate, the third stage drum being positioned between an outer housing and the screw shaft. The sludge may be transported with the screw flighting from the second area to a third area defined by an outer surface of the screw shaft and an inner surface of the third stage drum, the third area being larger than the second area. Moisture may be removed from the sludge through a third slot coupled to the third so drum. The method may also include rotating a fourth stage drum about the longitudinal axis at the second rate, the fourth stage drum being positioned between an outer housing and the screw shaft. The sludge may be transported with the screw flighting from the third area to a fourth area defined by an outer surface of the screw shaft and an inner surface of the fourth stage drum, the fourth area being larger than the third area. Moisture may be removed from the sludge through a fourth slot coupled to the fourth stage drum.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
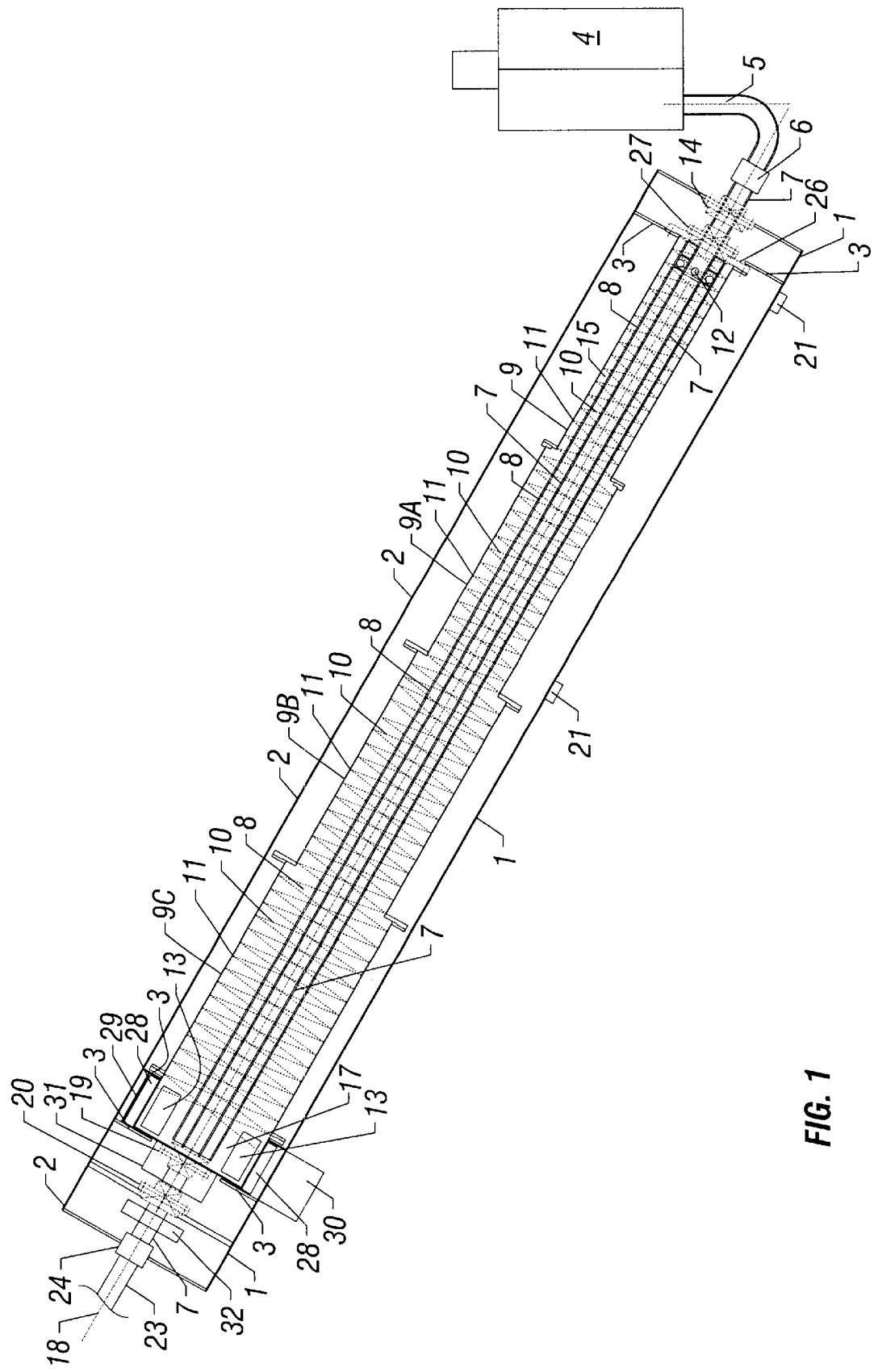
FIG. 1 shows a de-watering apparatus according to one embodiment of the present disclosure.

Embodiments of devices for de-watering material are illustrated in FIGS. 1–4. As illustrated, the apparatus includes a stationary outer housing 1, which may enclose, partially or completely, the contents of the apparatus. In one embodiment, outer housing 1 may be fabricated from a material such as carbon or stainless steel. Sealing may be accomplished in any manner suitable to contain material within the apparatus, but in the illustrated embodiment, sealing is accomplished with sealing lid 2, which may be constructed from carbon, stainless steel or any other suitable material.

The enclosure and its contents may be arranged at any configuration. For instance, the outer housing 1 and its contents may be set at a horizontal or an inclined angle. In the illustrated embodiment, the apparatus is inclined so as to facilitate loading of de-watered material into a truck, other transport, or trash-bin. Specifically, sludge may be introduced into the apparatus at the lower end, de-watered as it is transported through the device, and directly deposited into, for instance, a dump-truck or bin at the elevated end. This feature advantageously eliminates the need for a separate conveyor.

In one embodiment, the enclosure may be divided into separate chambers by means of partition plates 3. Partition plates 3 may be arranged and fabricated in such a way as to prevent released water or sludge from traveling between the chambers, without the use of seals between the partitions 3 and without any moving parts. Although partition plates may be fabricated from any material suitable to prevent released water from escape, in one embodiment, carbon or stainless steel may be used.

In operation according to one embodiment for de-watering sewage sludge, sludge-filled water and polymer may be mixed in a premixing chamber, such as chamber 4. The slurry may then be fed out of chamber 4 into feed pipe 5. In the illustrated embodiment, feed pipe 5 may be configured to feed the slurry via gravity, through sealed swivel joint 6. The slurry then travels through a hollow portion of feed shaft 7, the main, rotating shaft of the illustrated embodiment. Main shaft 7 may be held in place by any suitable device. As illustrated, it is held in place, supported, and rotated about a longitudinal axis, defined by outer housing 1, in a bearing 14. Bearing 14 may be bolted to the outer housing end. Main shaft 7 may be made from numerous different materials and be sized according to need. In the illustrated embodiment, main shaft 7 may be constructed from stainless steel. Although the illustrated embodiment utilizes a hollow portion main shaft 7 to introduce sludge into the apparatus, those having skill in the art, with the benefit of the present disclosure, will understand that main shaft 7 may be constructed without a hollow portion. In such an embodiment, sludge may be introduced directly into the apparatus by a separate feed tube or any other suitable manner known in the art.

Figure 2:
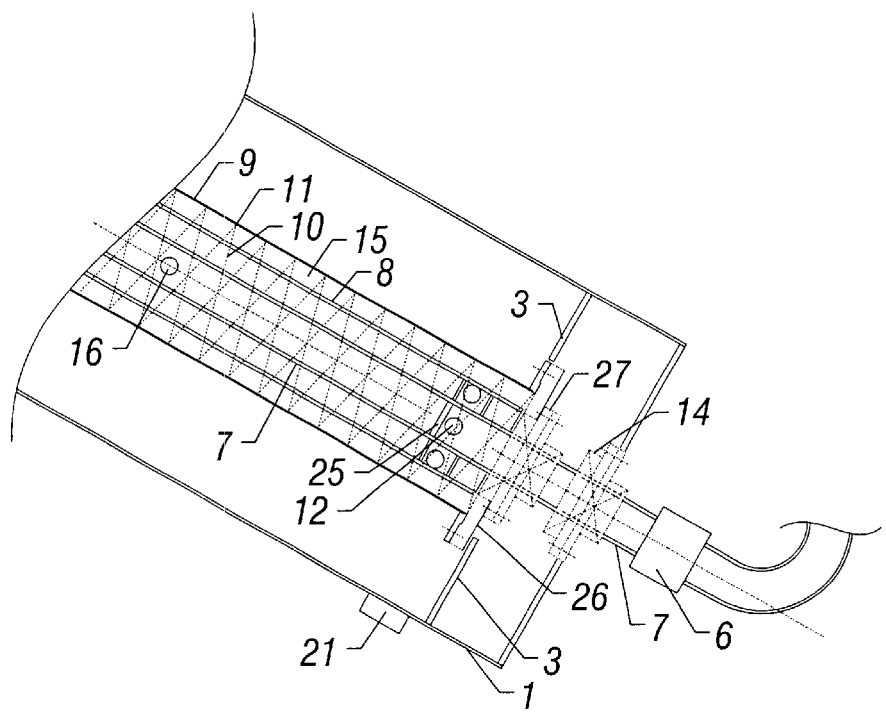
FIG. 2 shows an expanded view of an inlet end of a de-watering apparatus according to one embodiment of the present disclosure.
Figure 2A:
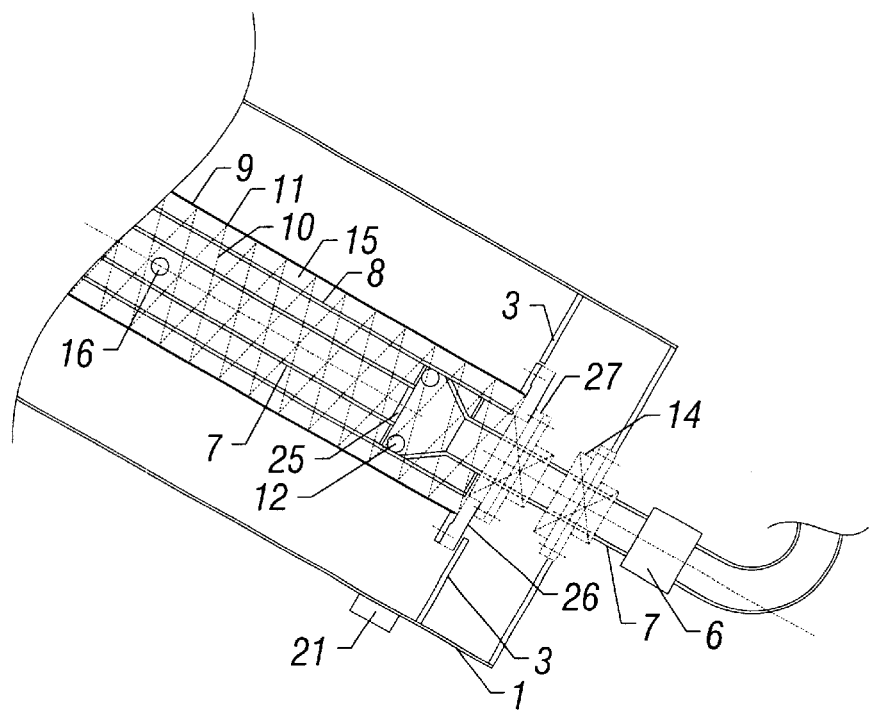
FIG. 2A shows an expanded view of an inlet end of a de-watering apparatus according to an alternative embodiment of the present disclosure.
Figure 3:
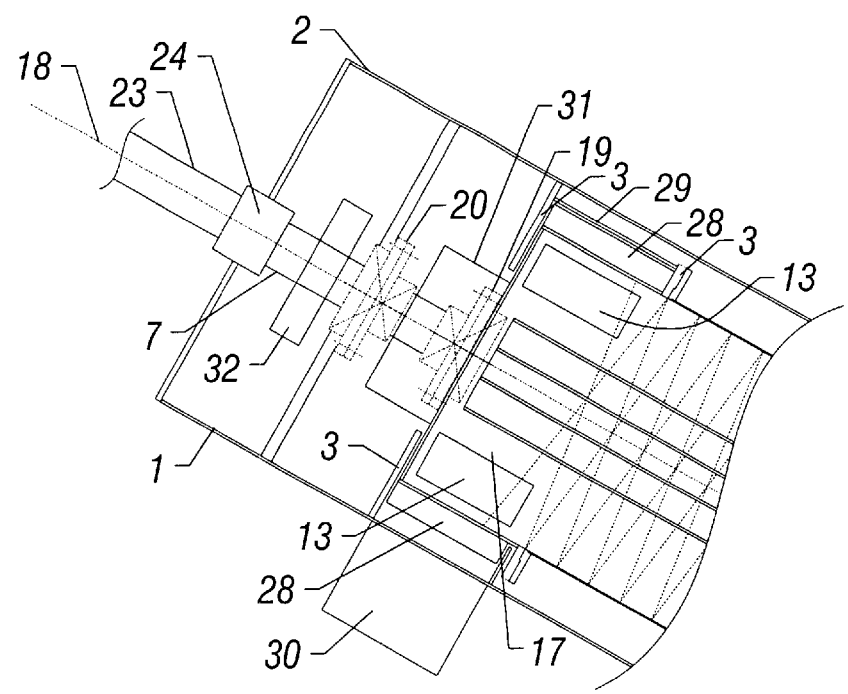
FIG. 3 shows an expanded view of an outlet end of a de-watering apparatus according to one embodiment of the present disclosure.
Figure 4:
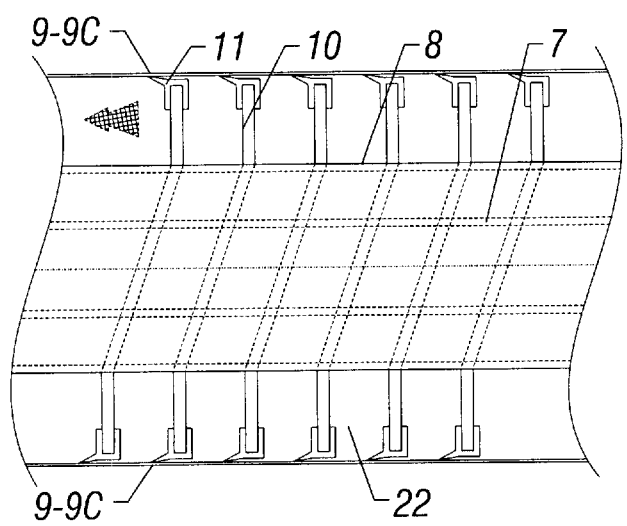
FIG. 4 shows an expanded view of an inner section of a de-watering apparatus according to one embodiment of the present disclosure.

With reference to FIGS. 2 and 2A, it may be seen that slurry may be fed out inlet holes 12, located around a hollow portion of shaft 7, and into a space defined by an outer surface of rotating screw shaft 8 and first stage drum 9. Specifically, in FIG. 2, slurry may be fed from a hollow portion of main shaft 7, out inlet hole 12 (illustrated as the center hole), and into a space defined between main shaft 7 and screw shaft 8. From that space, the slurry may be fed to an area between screw shaft 8 and first stage drum 9 via additional inlet holes 12, illustrated as being to the left and right of the center inlet opening of FIG. 2. In FIG. 2A, slurry may be fed form a hollow portion of main shaft 7, out inlet holes 12 directly to an area between screw shaft 8 and first stage drum 9. The size of inlet holes 12 and the spacing between main shaft 7, screw shaft 8, and first drum 9 may be configured and adjusted appropriately so as to introduce a controlled volume of sludge into the apparatus at a given time. Specifically, the size of the inlet holes and the spacing of the components may all be configured so as to effectively restrict the amount of sludge entering the device. This feature advantageously allows a user to control the incoming volume of sludge so that more moisture may be removed from the sludge. In particular, without being bound by theory, it is believed that by limiting the volume of incoming sludge (relative to the components of the apparatus), one may achieve greater de-watering than possible with previous devices. In one embodiment, utilizing an apparatus approximately having a housing about 3 feet wide and about 20 feet long, with inlet openings 12 having a diameter of about 2 inches, a main shaft 7 having a diameter of about 4 inches, a screw shaft 8 having a diameter of about 8.5 inches, and a first stage drum 9 having an inner diameter of about 12 inches, sludge has been favorably de-watered. It is contemplated that with a differently sized apparatus, different controlled volumes may be utilized by adjusting the spacing between the components and by appropriately sizing inlet holes 12. In such a manner, the incoming volume may be controlled so as to optimize the de-watering process.

In the illustrated embodiment, screw shaft 8 may be coupled to main shaft 7. In one embodiment, screw shaft 8 and main shaft 7 may rotate at the same angular velocity, but in other embodiments, the rotation may be suitably de-coupled so that a differential rotation rate may be achieved. Drums 9, including first stage drum 9, second stage drum 9A, third stage drum 9B, and fourth stage drum 9C, may be held in place and may be rotated by bearing and seal assembly 27. In the illustrated embodiment, this bearing is on the same centerline as bearing 14. Thus, main shaft 7, screw shaft 8 and drums 9 may all rotate on the same centerline, longitudinal axis 18.

One or more sets of screw flighting 10 may be coupled to screw shaft 8. In one embodiment, screw flighting 10 may be integral with screw shaft 8. Although various materials may be used, the screw flighting of the illustrated embodiment may be constructed from stainless steel. Screw flighting 10 may be configured to form one or more containment areas between screw shaft 8, drums 9–9C, and screw flighting 10. As described above, the spacing of such elements controls, in part, the volume of sludge entering and traveling through the apparatus at a given time, and therefore, may influence the effectiveness of the de-watering process.

In one embodiment, an outer edge of screw flighting 10 may include a wiper 11. Wiper 11 may be configured to continuously clean an inner surface of any one or all of drums 9, 9A, 9B, and 9C as the screw shaft 8, screw flighting 10 and wiper 11, rotate. In one embodiment, drums 9, 9A, 9B, and 9C may rotate at a different speed/speeds than screw shaft 8, screw flighting 10, and wiper 11—such differential speeds may, among other things, facilitate the cleaning of the drums via wiper 11 and the transfer of sludge through drums 9–9C. The shape of wiper 11 may be configured so that it not only cleans the inside surface of drums 9–9C, but also is so that it lifts sludge off of the drums and rolls the sludge as it moves along the inside of drums 9–9C. In lifting and rolling the sludge, wiper 11 may prevent screw flighting 10 from pushing fine sludge particles out through outlet holes/slots coupled to the drums.

With the benefit of the present disclosure, those of skill in the art will understand the rotational speeds of the main shaft 7, screw shaft 8, and drums 9–9C may vary widely according to application. In the illustrated embodiment, a suitable operational speed of drums 9–9C may be about 200 to 500 rotations per minute. In one embodiment, screw shaft 8 may rotate at about the same speed. The variation in the speed between the screw shaft 8 and the rotating drums 9–9C is variable, as is the speed of the components individually. Suitable speed controls (not illustrated) allow for screw shaft 8 and drums 9–9C to have speeds that may be varied independently of one other. The differential speed between the screw shaft 8 and drums 9–9C controls the volume and speed at which sludge slurry is allowed to enter the de-watering area between an outer surface of screw shaft 8 and an inner surface of drums 9–9C. The differential speed between the screw shaft 8 and drums 9–9C also may determine the amount of time it takes the sludge to travel from the inlet end of the apparatus, adjacent inlet holes 12, through the rotating drums 9–9C, and out the de-watered sludge discharge holes 13.

In the illustrated embodiment, the rotating drums 9–9C may be made so that their inner surfaces are smooth, with holes or slots that allow for water and other liquids to exit from the sludge being dried. The openings coupled to the drums may have a smaller opening on an inner surface than on an outer surface. In one embodiment, openings on an inner surface may range from about 0.008 inches to about 0.020 inches while openings on an outer surface may range from about 0.060 inches to about 0.080 inches. With the benefit of the present disclosure, however, those having skill in the art will understand that these opening sizes may vary widely according to application. In operation according to one embodiment, as sludge slurry enters first stage drum 9, it may start to immediately lose water through the holes or slots located in the first stage drum 9 wall.

In the illustrated embodiment, the first stage drum 9 may be relatively small, about 12 inches in inside diameter, which may be close to the diameter of the screw shaft 8. As the sludge is subjected to a centrifugal force, it may be moved along the inside of the first stage drum 9.

Drums 9–9C may be rotated by a drive assembly (not shown) as is known in the art. Such an assembly may turn the drums at a pulley or sprocket, such as sprocket 31. Main shaft 7, screw shaft 8, screw flighting 10, and wiper 11 may all be driven by a drive unit (not shown) as is known in the art via a pulley or sprocket, such as sprocket 32. The use of separate drives allow for independent operation of the components.

Again, the volume, and hence, the thickness, of the initial sludge is believed to influence the effectiveness of de-watering. The thickness may be determined by the area of the space between the screw shaft 8 and the inner surface of the drums 9–9C. As may be seen with reference to FIG. 1, this area is greater in second stage drum 9A than in first stage drum 9. Similarly, the area in third stage drum 9B is greater than that of second stage drum 9A. The area in fourth stage drum 9C is greater than that of third stage drum 9B. In the illustrated embodiment, the sludge becomes more compact, de-watered, and firm as it enters the second stage drum 9A from first stage drum 9. In one embodiment, second stage drum 9A may rotate at the same approximate speed as first stage drum 9, but it may have a larger diameter. In one embodiment, second stage drum may have a size of about 16 inches in inside diameter. This increase in diameter imparts a higher centrifugal force on the controlled volume of sludge.

The holes/slots coupled to the wall of second stage drum 9A may be the same size or larger than the holes/slots of first stage drum 9, giving a larger open area for liquid to be released through the drum 9A wall. As the sludge is dried in second stage drum 9A, it may be moved via screw flighting 10 and, in embodiments utilizing a wiper, may also be massaged by wiper 11 along the inside of second stage drum 9A. In this manner, the sludge may be pushed into. stage III, including drum 9B. In one embodiment, third stage drum 9B may rotate at about the same speed as drums 9 and 9A, but it may have a larger diameter. In one embodiment, third stage drum 9B may have about a 20 inch inside diameter. This increase in diameter imparts a higher centrifugal force on the drying sludge. The holes/slots in the walls of third stage drum 9B may be the same size or larger than the holes/slots of second stage drum 9A, giving a larger open area for the water and liquids to be released through the third stage drum 9B wall.

As the sludge is dried in third stage drum 9B it may be moved by screw flighting 10 and, in embodiments utilizing a wiper, may also be massaged by wiper 11 along the inside of the drum 9B. In this manner, the sludge may be pushed into stage IV, including fourth stage drum 9C. In one embodiment, fourth stage drum 9C may rotate at the same speed as drums 9–9B, but it may have a larger diameter. In one embodiment, fourth stage drum may have about a 24 inch inside diameter. This increase in diameter imparts a higher centrifugal force on the drying sludge. The holes/slots in the walls of fourth stage drum 9C may be the same size or larger than the holes/slots of third stage drum 9B, giving a larger open area for the water and liquids to be released through the fourth stage drum 9C wall.

As the sludge is dried in fourth stage drum 9C, it may be moved by the screw flighting 10, and in embodiments utilizing a wiper, may also be massaged by the wiper 11 along the inside of the fourth stage drum 9C. In this manner, the sludge may be pushed out the discharge end of the apparatus, and if inclined, may be directly loaded into an appropriate transport or bin without the need for a separate conveyor.

With the benefit of the present disclosure those of skill in the art will recognize that more or fewer stages may be utilized to de-water sludge. Specifically, one may utilize only a first and second stage drum 9 and 9A. One may also choose to only utilize a first stage drum 9. Alternatively, one may utilize more than the four stage system illustrated herein. For instance, one may to choose any number or additional stages to achieve a desirable degree of de-watering. In such embodiments, the relative sizes of each drum stage may vary as well. For instance, the increase in diameter from one stage to another may be large or slight, according to need and/or application.

The discharge end 16, of drums 9–9C is where dried sludge exits the drying process. In one embodiment, this end may contain a support bracket 17 configured to hold drums 9–9C in place. Support bracket 17 also may be configured to allow the drums to rotate about the centerline, longitudinal axis 18 via the use of a bearing assembly such as assembly 19. In the illustrated embodiment, support bracket 17 not only holds the drums 9–9C in place around main shaft 7 and longitudinal axis 18, but it also includes sludge outlet holes 13 and wiper fins 28. Fins 28 may be configured to wipe sludge from discharge cowling 29, so that it may exit housing 1, at the outlet 30.

In the illustrated embodiment, bearing assembly 20 holds the discharge end of the apparatus at main shaft 7 to housing 1. This allows main shaft 7, screw shaft 8, flighting 10, wiper 11, and drums 9–9C to rotate inside the housing 1. The water and liquids forced out of the sludge slurry as it is dried may fall to the bottom of the housing 1 and may drain out discharge pipes and/or holes 21, which may be located in the bottom of the housing 1.

In the illustrated embodiment, the drums 9–9C may be bolted to lower end plate support 26 and bearing 27 through a suitable flange connection with centering pilots so as to ensure rotation about fixed longitudinal axis 18. The drums may be bolted to the upper support bracket 17 and bearing 19 through a suitable flange connection with centering pilots to ensure a rotation about a fixed longitudinal axis 18. Each of the drums 9–9C may be bolted to each other through flange connections, or any other suitable coupling device. For example, centering pilots and accepting mating surfaces may be utilized to ensure that each drum run true and around the same longitudinal axis 18.

In one embodiment, a de-watering. apparatus may also be equipped with an internal washing system. Such a system may be configured to continuously wash holes/slots of drums 9–9C from the inside. In such an embodiment, screw shaft 8 may be set up with two or more sets of screw flightings 10, which may run parallel to each other. Flighting 10 may be equipped with wiper 11, as previously described. One area between two rows of flightings 10 may be blocked off at or adjacent inlet holes 12 to provide an area running along the entire length of the screw flightings 10 and wipers 11 that is free from sludge, and which is isolated by the wipers 11. Screw shaft 8 may be equipped with wash nozzles 22, which may be spaced as needed, along the entire length of the screw shaft 8 in this sludge free area. Wash water may be fed from the discharge end of the apparatus into main shaft 7. Main shaft 7 may include a dividing plate 25, located just above inlet holes 12 that isolates the sludge-feed end of the main shaft 7 from the water-feed end of shaft 7. Main shaft 7 may also contain water outlet holes 16 to allow wash water to enter the space between main shaft 7 and screw shaft 8 and out through the wash nozzles 22. In embodiments utilizing a differential speed technique, it will be understood that as screw shaft 8 rotates at a different speed than drums 9–9C, the wash nozzles 22 may wash the entire inside surface of drums 9–9C. The wash water may exit the holes/slots in drums 9–9C, exiting along with water and liquids from the sludge slurry being dried in the apparatus. In this embodiment, the wash water may be fed into main shaft 7 via any suitable means. As illustrated, the introduction of wash water may be achieved with pipe 23 through swivel joint 24.

While the present disclosure may be adaptable to various modifications and alternative forms, specific embodiments have been shown by way of example and described herein. However, it should be understood that the present disclosure is not intended to be limited to the particular forms disclosed. Rather, it is to cover all modifications, equivalents, and alternatives falling within the spirit and scope of the disclosure as defined by the appended claims.

Moreover, the different aspects of the disclosed apparatus and methods may be utilized in various combinations and/or independently. Thus the invention is not limited to only those combinations shown herein, but rather may include other combinations. Those of skill in the art will understand that numerous other modifications may be made to the disclosed method and apparatus, but all such similar substitutes and modifications are deemed to be within the spirit, scope and concept of the invention.

What is claimed is:

1. An apparatus for de-watering sludge, comprising:
   an outer housing defining a longitudinal axis;
   a main shaft configured to rotate about the longitudinal axis;
   a screw shaft coupled to the main shaft and configured to rotate about the longitudinal axis;
   a drum positioned between the outer housing and the screw shaft, the drum configured to rotate about the longitudinal axis, the drum having a slot comprising a smaller opening on an inner surface of the drum than on an outer surface of the drum;
   an inlet configured to introduce the sludge to an area defined by an outer surface of the screw shaft and an inner surface of the drum;
   screw flighting coupled to the screw shaft, the screw flighting configured to rotate about the longitudinal axis to transport the sludge longitudinally along the drum; and
   a wiper coupled to the screw flighting, the wiper configured to clean an inner surface of the drum and to roll the sludge along the drum.

2. The apparatus of claim 1, wherein the main shaft has a substantially constant outer diameter and wherein the screw shaft has a substantially constant outer diameter.

3. The apparatus of claim 1, further comprising a wash nozzle coupled to the screw shaft.

4. The apparatus of claim 1, wherein the outer housing is inclined.

5. An apparatus for de-watering sludge, comprising:
   an outer housing defining a longitudinal axis;
   a main shaft configured to rotate about the longitudinal axis;
   a screw shaft coupled to the main shaft and configured to rotate about the longitudinal axis;
   a drum positioned between the outer housing and the screw shaft, the drum configured to rotate about the longitudinal axis;
   one or more volume-restricting inlet holes coupled to the main shaft and configured to introduce a controlled volume of the sludge between the screw shaft and the drum, the controlled volume being adjustable by varying the size of the inlet holes and the spacing between the main shaft, screw shaft, and drum; and
   screw flighting coupled to the screw shaft, the screw flighting configured to rotate about the longitudinal axis to transport the sludge longitudinally along the drum.

6. The apparatus of claim 5, the drum having a slot comprising a smaller opening on an inner surface of the drum than on an outer surface of the drum.

7. The apparatus of claim 5, further comprising a wiper coupled to the screw flighting, the wiper configured to clean an inner surface of the drum and to roll the sludge along the drum.

8. The apparatus of claim 5, wherein the inlet holes comprise:

an inlet hole in the main shaft leading to an area between the main shaft and the screw shaft; and an inlet hole in the area between the main shaft and the screw shaft, leading to an area between the screw shaft and the drum.

9. The apparatus of claim 5, wherein the inlet holes have a diameter of about 2 inches.

10. The apparatus of claim 5, comprising three inlet holes.

11. The apparatus of claim 5, wherein the main shaft has a substantially constant outer diameter and wherein the screw shaft has a substantially constant outer diameter.

12. The apparatus of claim 5, further comprising a wash nozzle coupled to the screw shaft.

13. The apparatus of claim 5, wherein the outer housing is inclined.

14. A method for de-watering sludge, comprising:

rotating a main shaft about a longitudinal axis at a first rate;

rotating a screw shaft coupled to the main shaft about the longitudinal axis at the first rate;

rotating screw flighting coupled to the screw shaft about the longitudinal axis at the first rate;

rotating a drum about the longitudinal axis at a second rate, the drum being positioned between an outer housing and the screw shaft;

introducing a controlled volume of the sludge to a first area defined by an outer surface of the screw shaft and an inner surface of the first stage drum via one or more volume-restricting inlet holes coupled to the main shaft; and removing moisture from the sludge through a slot coupled to the drum.

15. The method of claim 14, wherein the slot comprises a smaller opening on an inner surface of the drum than on an outer surface of the drum.

16. The method of claim 14, further comprising adjusting the first and second rates to reduce the controlled volume.

17. The method of claim 14, wherein the first rate is less than the second rate.

18. The method of claim 14, wherein the first rate equals the second rate.

19. The method of claim 14, further comprising cleaning an inner surface of the first stage drum with a wiper coupled to the screw flighting.

20. The method of claim 14, further comprising cleaning an inner surface of the first stage drum with a wash nozzle coupled to the screw shaft.

* * * * *